(12) United States Patent
Hu et al.

(10) Patent No.: US 7,546,308 B1
(45) Date of Patent: Jun. 9, 2009

(54) MODEL AND METHOD OF AN N-TIER QUALITY-OF-SERVICE (QOS)

(75) Inventors: Ron-Chung Hu, Palo Alto, CA (US); Barry Holroyd, Mountain View, CA (US)

(73) Assignee: Symantec Operating Corporation, Cupertino, CA (US)

( * ) Notice: Subject to any disclaimer, the term of this patent is extended or adjusted under 35 U.S.C. 154(b) by 792 days.

(21) Appl. No.: 10/944,511

(22) Filed: Sep. 17, 2004

(51) Int. Cl.
*G06F 7/00* (2006.01)
*G06F 17/30* (2006.01)
(52) U.S. Cl. .................................. 707/102; 707/103 R
(58) Field of Classification Search ................. 707/102; 770/229; 709/226
See application file for complete search history.

(56) References Cited

U.S. PATENT DOCUMENTS

| | | | | |
|---|---|---|---|---|
| 4,495,570 | A * | 1/1985 | Kitajima et al. | 718/105 |
| 6,119,207 | A * | 9/2000 | Chee | 711/158 |
| 6,212,544 | B1 * | 4/2001 | Borkenhagen et al. | 718/103 |
| 6,430,593 | B1 * | 8/2002 | Lindsley | 718/103 |
| 6,546,017 | B1 | 4/2003 | Khaunte | 370/412 |
| 6,560,674 | B1 * | 5/2003 | Hosogi et al. | 711/118 |
| 6,578,068 | B1 * | 6/2003 | Bowman-Amuah | 709/203 |
| 2002/0152305 | A1 * | 10/2002 | Jackson et al. | 709/224 |
| 2004/0006602 | A1 * | 1/2004 | Bess et al. | 709/207 |
| 2004/0153545 | A1 * | 8/2004 | Pandya et al. | 709/226 |
| 2004/0257985 | A1 * | 12/2004 | Sahai et al. | 370/229 |
| 2005/0169296 | A1 * | 8/2005 | Katar et al. | 370/445 |

* cited by examiner

*Primary Examiner*—Mohammad Ali
*Assistant Examiner*—Angelica Ruiz
(74) *Attorney, Agent, or Firm*—Campbell Stephenson LLP

(57) ABSTRACT

A method for increasing the QoS in a data center. The method can be employed in first and second components of the data center. In one embodiment, the method includes a first component of the data center receiving first and second requests. The first component generates first and second priority values corresponding to the first and second requests, respectively. The first component processes the first and second requests to generate third and fourth requests, respectively, wherein the first request is processed before the second request if the first priority value is numerically greater than the second priority value, or the first request is processed after the second request if the first priority value is numerically less than the second priority value. A second component of the data center receives the third and fourth requests. The second component generates third and fourth priority values corresponding to the third and fourth requests, respectively. The second component processes the third and fourth requests wherein the third request is processed before the fourth request if the third priority value is numerically greater than the fourth priority value, or the third request is processed after the fourth request if the third priority value is numerically less than the fourth priority value. In one preferred embodiment, if the first priority value is numerically greater than the second priority value, then the third priority value generated by the second component should not be numerically less than the fourth priority value generated by the second component.

15 Claims, 5 Drawing Sheets

MODEL AND METHOD OF AN N-TIER QUALITY-OF-SERVICE (QOS)

BACKGROUND OF THE INVENTION

Most businesses employ data centers to facilitate online transactions. For example, stock brokerage firms have data centers that provide online brokerage services to users via their client computer systems, including automated placement of orders to buy or sell securities (i.e., stocks or bonds), portfolio tracking, and related market information, news, and services 24 hours a day, seven days a week.

Data centers typically consist of components (e.g., servers, hubs, switches, storage systems, load balancers, etc.) that in combination reply to user requests (e.g., electronic requests to buy or sell stock in a publicly traded company). Replies from data centers may take many forms. For example, replies may take form in web pages containing information (e.g., the price at which stock in a company was purchased or sold) corresponding to respective user requests.

Data centers are measured by the quality of service (QoS) they provide to users. QoS in turn is determined by many factors including reply time, the overall time it takes a data center to reply to a user request. Data centers are processing bandwidth limited. In other words, data centers can process a limited number of user requests in a given period of time. If a data center becomes overloaded with user requests, reply times for the user requests will increase. Long reply times are viewed unfavorably.

Data center components (e.g., servers, switches, disk arrays, etc.) are often manufactured by different vendors. Nonetheless, the components are required to cooperate with each other when responding to user requests from client computer systems. A set of system requests are generated within a data center in response to the data center receiving a user request. These internally generated system requests call on various components within the data center to perform specific tasks. For example, a user request may be received by a web server of a data center. To respond to the user request, the web server may need the services provided by an application server, and accordingly the web server transmits a request for data processing to the application server. To respond to the application processing request, the application server may need to access data stored in a database, and accordingly the application server transmits a request to access data to a database server. The database server may need to access a disk array in order to reply to the application server's request, and accordingly the database server generates a request to access data in the disk array. Eventually, the application server receives a reply from the database server after the database server receives a reply to its request to access data in the disk array. The application server may process data included in the reply from the database server, which leads to the eventual reply to the user request by the web server.

Architectures (i.e., the way components are coupled together to provide data center services) vary from data center to data center. For example, components of data centers may be cobbled together as a distributed n-tier system or as a utility computing system. FIG. 1 illustrates relevant components of an exemplary data center 10 configured as a distributed n-tier system, while FIG. 2 illustrates relevant components of an exemplary utility computing data center 40.

The data center 10 of FIG. 1 includes a load balancer 12 coupled to client computer systems 14 and 16 via a network such as the Internet. The load balancer in turn is coupled to a tier of web servers 20a-20w. User requests are received by the load balancer by client computer systems and subsequently distributed to web servers 20a-20w so that no web server becomes overloaded with user requests relative to another. A tier of application servers 22a-22x are coupled to web servers 20a-20w via a local area network (LAN) 24. Application servers 22a-22x are coupled to a tier of database servers 26a-26y via data access network 30. Database servers 26a-26y execute database management systems that maintain and provide one or more databases for data access by application servers 22a-22x. Lastly, a storage area network (SAN) 32 consisting of switches, routers, and/or hubs (not shown) couples database servers 26a-26y to a tier of storage systems 34a-34z. While it is said that databases store data, in reality the data is stored in memory devices of storage systems 34a-34z. For purposes of explanation, each of storage systems 34a-34z takes form in a disk array, it being understood that the term storage systems should not be limited thereto.

Utility computing is becoming an increasingly popular architecture in data centers. Utility computing is a service provisioning model in which data storage and processing services can be made available on an "as needed basis." In utility computing, different entities are charged for their actual use of data storage and/or processing services. The exemplary utility computing data center 40 in FIG. 2 includes a processing resource group 42 coupled to storage resource group 44 via network resource group 46. Processing resource group 42 includes a plurality of servers which can be dynamically allocated on demand to perform various processing tasks. For example servers in group 42 can be allocated to execute application programs, database management systems, file systems, etc. Network resource group 46 includes SAN switches, routers (not shown), etc. The components of network resource group can be dynamically allocated to create data paths between components (e.g., disk arrays) of storage resource group 44 and servers of processing resource group 42.

Regardless of how a data center is configured, data center components (i.e., servers, switches, disk arrays, etc.) are required to act in concert in order to reply to user requests from client computer systems. The term execution path will be used herein to refer to a combination of components that collectively process user requests from client computer systems. As will be more fully described below, each component in the execution path may introduce an unanticipated element of delay as a result of being overloaded with requests from other components. The delay introduced by any one or more components of the execution path increases the overall time needed to reply to user requests. It should be noted that data centers may contain more than one execution path.

FIG. 3 illustrates relevant components of an exemplary execution path within a data center such as data center 10 of FIG. 2. From bottom to top, the components of the execution path in FIG. 3 include a disk array 50, database server 52, application server 54, and web server 56. Data paths (not shown) are provided between the components and function to transmit system requests as will be more fully described below.

Disk array 50 contains several hard disks. Each hard disk includes sequentially numbered physical memory blocks for storing data. The hard disks of array 50 may be logically combined by storage software (not shown) to present database server 52 with disk-like storage entities commonly known as virtual disks. Virtual disks typically have better characteristics (e.g., higher storage capacity, greater effective data transfer rates, etc.) than their underlying hard disks. In essence, a virtual disk can be seen as a set of sequentially numbered logical data blocks. Each logical data block is mapped to one or more physical data blocks of one or more underlying hard disks. While it may be said that a logical data block stores data, in reality data of the logical block is stored in a physical memory block mapped thereto by the storage software executing on the disk array. Any request received by disk array 50 to access data of a logical disk block must be translated into one or more requests to access one or more physical memory blocks allocated thereto.

As the value of data sharing becomes apparent, database management systems evolved to provide application-independent means of organizing data so that multiple applications could use the same data and so that the data itself could evolve independently from applications. Database management systems transform numbered data blocks into more business-oriented data items, such as character strings, binary and floating point numbers, and arrays of these objects. The most popular form of database is the relational database which organizes related data items into records and orders sets of like records into tables. Relational database management systems also maintain relationships between records of different types and enforce data consistency roles and transaction constraints. Database server 52 executes a database management system that organizes one or more databases on virtual disks presented by disk array 50. Accordingly, any request to access database data stored on a virtual disk must be translated by the database server 52 into a request to access a virtual disk provided by disk array 50.

Application server 54 processes requests received from web software 56 in accordance with a set of rules or algorithms defined in an application program. Application server 54 often generates requests to access (i.e., read or write) data from one or more databases provided by database server 52 in response to processing requests from web server 56. Web server 56 receives user requests from client computer systems coupled thereto. User requests to run an application are passed to application server 54. Typically, web server 56 sends replies (e.g., web-pages, forms, etc.) to client software (e.g., browser) using HTTP after user requests have been completed in execution path 10.

The components of an executing path, such as the execution path shown in FIG. 3, cooperate to reply to user requests received from client computer systems. When a user request is received from a client computer system, a process is started in an execution path, such as the execution path shown in FIG. 3, which ultimately leads to the generation of a corresponding reply. Cooperation between components will be described with reference to the execution path shown in FIG. 3.

Presume web server 56 receives a user request UR from a client computer system. User requests are stored in a web server queue 57 in the order received from client computer systems until they can be processed by a process executing on one or more processors in web server 56. User requests are output from the web server queue 57 for processing in the order they are received therein. Web server 56 may generate one or more application processing requests when it receives and processes a user request. For purposes of explanation only, it will be presumed that web server 56 generates a single application processing request in response to receiving and processing a user request. As such, web server 56 generates an application processing request APR in response to processing the user request UR.

Application server 54 receives the application processing request APR from web server 56. Application server 54 includes an application server queue 55 that stores application processing requests in the order received from web server 56 or other web servers (not shown in FIG. 3). Application processing requests are outputted from queue 55 for processing in the order received by an application program executing on one or more processors. Application server 54, in response to processing each application processing request, may generate one or more requests to read data from or write data to one or more databases managed by database server 52. For purposes of explanation only, it will be presumed that application server 54 generates a single database access request in response to receiving and processing an application processing request. Thus, application server 54 generates a database access request DBAR in response to processing the application processing request APR.

Database server 52 receives the database access request DBAR from application server 54. Database server 52, like application server 54, includes a queue 53 that stores database access requests in the order received from application server 54 or other application servers (not shown in FIG. 3). Database access requests are outputted from queue 55 for processing in the order received by database management system executing on one or more processors. Database server 52, in response to processing each database access request, generates one or more requests to access one or more virtual disks provided by disk array 50. For purposes of explanation only, it will be presumed that database server 52 generates a virtual disk access request in response to receiving and processing a database access request. Accordingly, database server 52 generates virtual disk access request VDAR in response to processing the database access request DBAR.

Disk array 50 receives the virtual disk access request VDAR from database server 52. Disk array 50 includes a queue 51 that stores virtual disk access requests in the order received from database server 52 or other database servers (not shown in FIG. 3). Virtual disk access requests are outputted from queue 51 for processing in the order received by disk virtualizing software executing on one or more processors. Virtualizing software executing on disk array 50, in response to processing each virtual disk access request, generates one or more requests to access data in one or more hard disks of disk array 50. For purposes of explanation only, it will be presumed that disk array 50 generates a single hard disk access request in response to receiving and processing a single virtual disk access request. Accordingly, disk array 50 generates a hard disk access request HDAR in response to processing the virtual disk access request VDAR. Disk array 50 completes hard disk access requests by reading data from or writing data to one or more hard disks.

Processes executing on components 50-56 generate replies corresponding to the requests they receive. For example, after the hard disk access request HDAR has completed (i.e., data is read from or written to a hard disk of disk array 50), the disk virtualizing system of disk array 50 generates a virtual disk access reply VDARR indicating that the corresponding virtual disk access request VDAR has been completed. VDARR may include, for example, information read from a hard disk or an acknowledgement that a write operation has been completed. The database management system of database server 52 generates a database access request reply DBARR in response to receiving and processing virtual disk access request reply VDARR. Database access request reply DBARR corresponds to DBAR and is provided to application server 54. The application program of application server 54 generates an application processing request reply APRR in response to receiving and processing the database access request reply DBARR. Any data contained in the replies from database server 52 may be processed in accordance with the rules or algorithm defined in the application executing on server 54. The application processing request reply APRR corresponds to the application processing request APR and is transmitted to web server 56. The process executing on web server 56 generates a user request reply URR in response to receiving and processing the application processing request reply APRR. The user request reply URR corresponds to the original user request UR and is transmitted to the client computer system that generated the user request UR.

Each of the components is processing bandwidth limited. In other words, each of the components in the data path shown in FIG. 3 can process a limited number of requests in a given period of time. The request queues (e.g., application server queue 55) store requests in the order received until they can be processed. There is a delay between the time a new request (e.g., a new application processing request APR) is received in a queue and the time when the new request is outputted for processing. The delay in the queue for each newly received request depends on the number of prior requests pending in the queue. If the queue stores a large number of prior requests, the time between the new request is received in the queue and the time when the new request is outputted for processing will be relatively large.

At any given time, it is possible that the queue of a component in execution path of FIG. 3 may store an excessively large number of requests. For example, queue 55 of application server 54 may store an unusually large number of application processing requests received from web server 56 or other web servers (not shown). Because the queue stores a large number of application processing requests, the processing of any new request received by the queue will be delayed substantially since requests are processed in the order they are received in the queue. The delay caused by a crowded queue will, in turn, delay replies to several user requests received by web server 56 while the application processing request queue is overcrowded.

Increased reply times may have negative implications. To illustrate, presume the execution path illustrated in FIG. 3 is configured to process user requests to buy or sell shares of stock in publicly traded companies. Presume also that the execution path receives user requests to buy or sell stock from many different client computer systems. Some of these user requests may include orders to buy or sell a small number of shares and accordingly involve a small amount of money, while other user requests include orders to buy or sell a large number of shares and involve a large amount of money. Suppose further that application server queue 55 stores more application processing requests than can be processed by the application program without significant delay. As a result, reply times for user requests to buy or sell stock will be delayed significantly while the application server queue 55 is crowded with pending requests. Indeed, the delay introduced by the application server queue 55 of application server 54 may be so long that sellers who initiate user requests may end up losing a large amount of money if their user requests to sell a large number or shares are delayed while the market price in their stocks rapidly decreases.

SUMMARY OF THE INVENTION

A method for increasing the QoS in a data center. The method can be employed in multiple components of computer systems in a data center. For ease of illustration, the summary of the invention will be explained with reference to the use of first and second components of a computer system in the data center. In one embodiment, the method includes the first component of the data center receiving first and second requests. The first component generates first and second priority values corresponding to the first and second requests, respectively. The first component processes the first and second requests to generate third and fourth requests, respectively, wherein the first request is processed before the second request if the first priority value is numerically greater than the second priority value, or the first request is processed after the second request if the first priority value is numerically less than the second priority value. The second component of the data center receives the third and fourth requests. The second component generates third and fourth priority values corresponding to the third and fourth requests, respectively. The second component processes the third and fourth requests wherein the third request is processed before the fourth request if the third priority value is numerically greater than the fourth priority value, or the third request is processed after the fourth request if the third priority value is numerically less than the fourth priority value. Although there are many combinations of the priority values on multiple components, in one preferred embodiment a high priority request should receive consistent and distinguishable high-priority values across multiple components of a system during its execution when compared to low-priority requests. Thus, if the first priority value is numerically greater than the second priority value, then the third priority value generated by the second component should not be numerically less than the fourth priority value generated by the second component.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
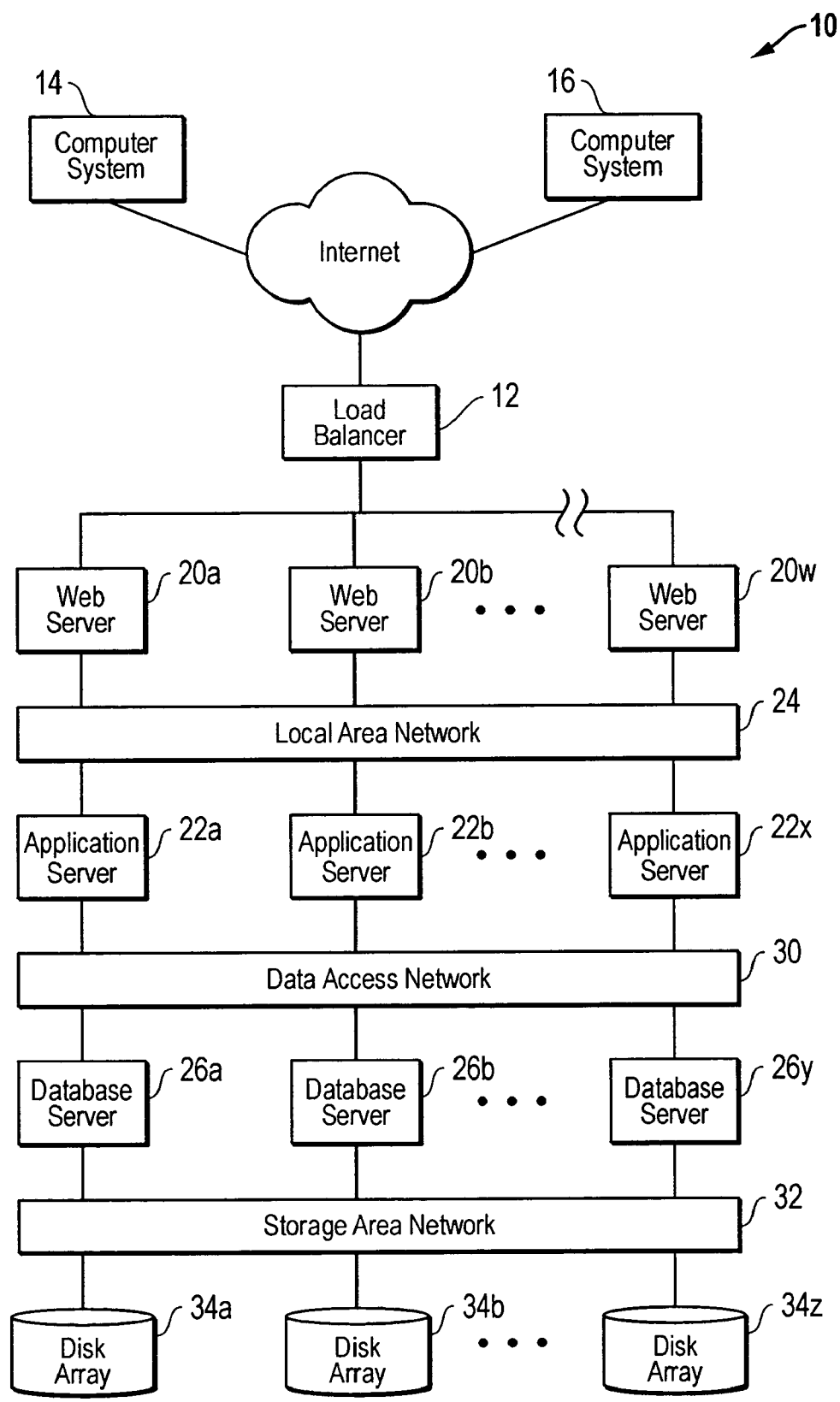
FIG. 1 shows a block diagram of relevant components of a data center.
Figure 2:
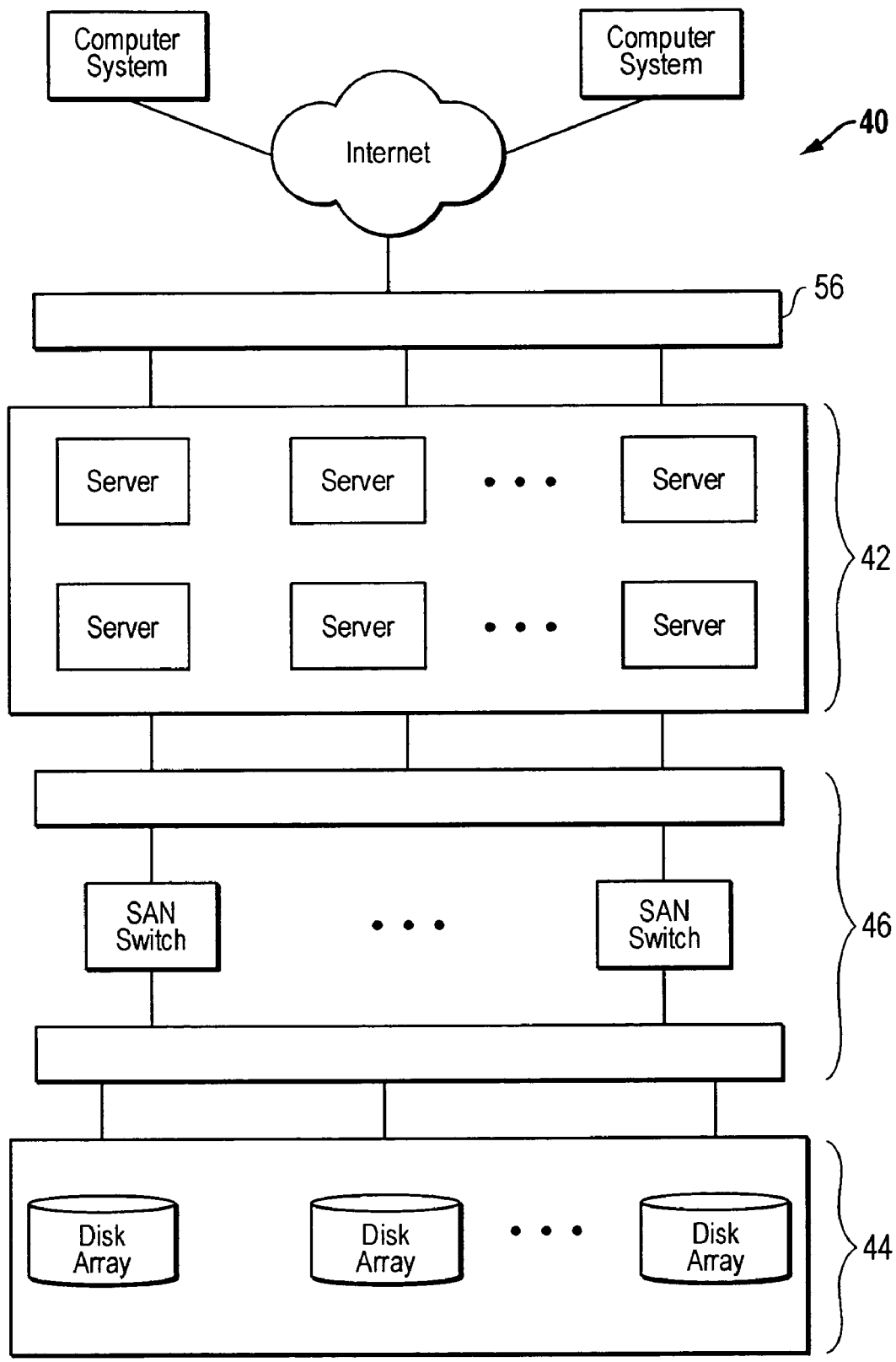
FIG. 2 shows a block diagram of relevant components of a data center using Utility Computing architecture with shareable resources.

The present invention solves the aforementioned problems and others and provides a system or method for improving the overall time it takes a data center to reply to user requests, it being understood that the present invention should not be limited to use within data centers. An improvement in reply time increases the QoS of a data center. The present invention can be employed in one or more components (e.g., load balancers, servers, disk arrays, etc.) of a data center. Additionally, the present invention can be employed in one or more components (e.g., routers, hubs, switches, etc.) in data communication between a data center and a client computer system that generates the user requests. The present invention, however will be described as employed in a data center.

The present invention can be employed in a data center that consists of loosely coupled components. For example, the present invention can be employed in a data center configured as a distributed n-tier system of loosely coupled components or in a utility computing data center in which components are allocated on an as-needed basis. Regardless of the architecture employed, at least one component in a data center employing the present invention calculates and assigns priority values to requests (e.g., user requests, requests to access databases, etc.) it receives. Those requests assigned a higher priority are processed in the component before requests assigned a lower priority.

In contrast to the data center components described in the background section above, a data center component employing the present invention does not necessarily process requests in the order they are received by the component. Some requests may be processed before other previously received requests are processed by the component. The overall reply time for some user requests received from client computer systems may be reduced relative to the overall reply time for other user requests as a result of one or more data center components employing the present invention.

In a preferred embodiment, at least two or more components of a computer system in a data center calculate and assign priority values to requests they receive. To illustrate, first and second requests are received by a first component. The first component generates first and second priority values corresponding to the first and second requests, respectively, based on respective request attributes and/or other information as will be more fully described below. The first component processes the first and second requests in an order defined by the first and second priority values. The first component generates third and fourth requests in response to processing the first and second requests, respectively. The third and fourth requests are provided to the second component. The second component generates third and fourth priority values corresponding to the third and fourth requests, respectively, based on attributes of the respective requests and/or other information. The second component processes the third and fourth requests in an order defined by the third and fourth priority values. The request attributes and/or other information used to generate the first priority value should be the same or similar to the request attributes and/or other information used to generate the third priority, and the request attributes and/or other information used to generate the second priority value should be the same or similar to the request attributes and/or other information used to generate the fourth priority. Additionally, the algorithm used by the first component to generate the first and second priority values should be the same as or similar to the algorithm used by the second component to generate the third and fourth priority values. As such, the third and fourth priority values should be consistent with the first and second priority values. In other words, if the first priority value calculated for the first request is numerically greater than the second priority calculated for the second request such that the first request is processed by the first component before the second request, then the third priority value calculated for the third request should be numerically greater than the fourth priority calculated for the fourth request such that the third request is processed by the second component before the fourth request.

Figure 4:
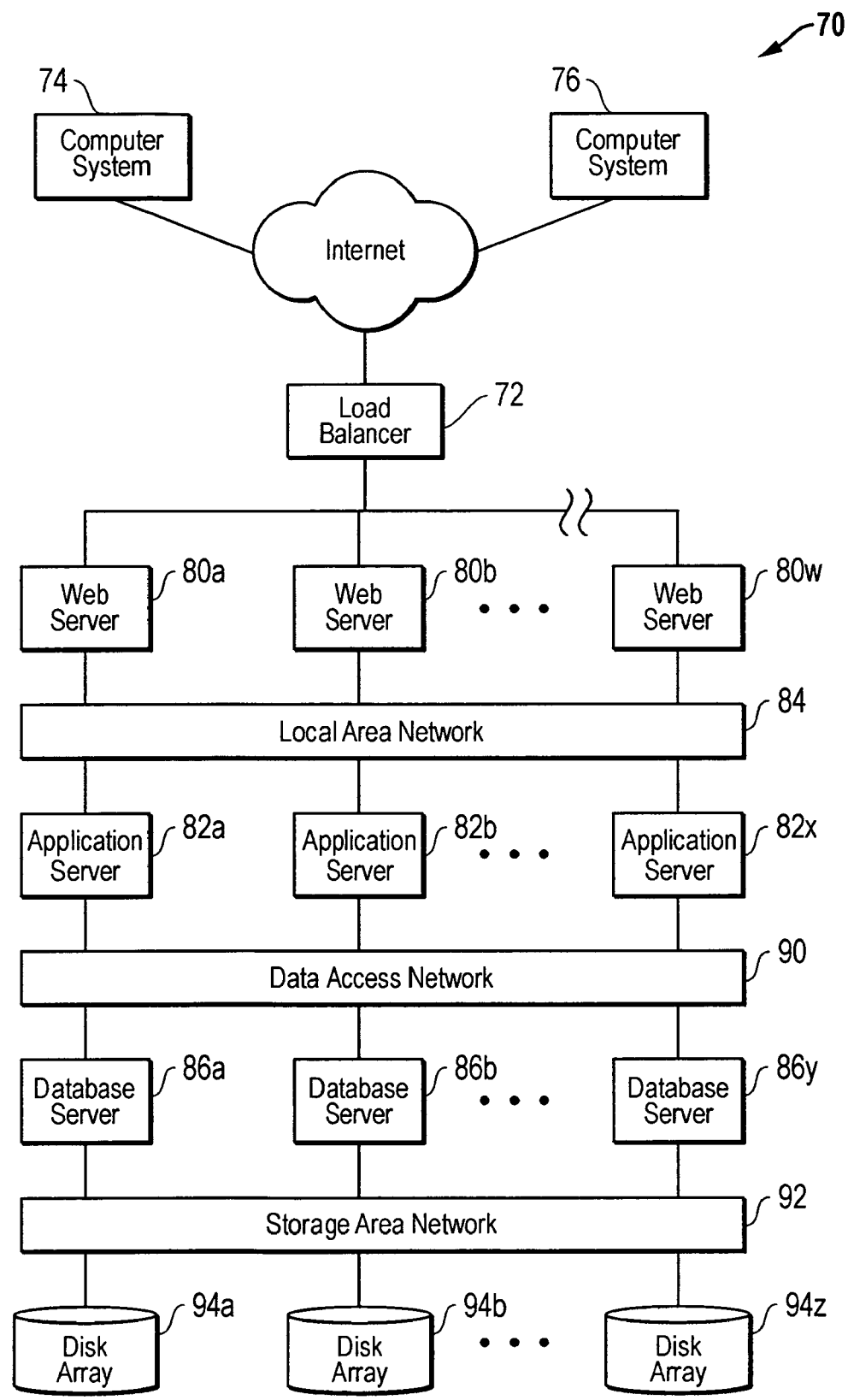
FIG. 4 illustrates relevant components of a data center employing the present invention.

FIG. 4 illustrates an exemplary data center 70 employing one embodiment of the present invention. The present invention will be described with reference to a data center configured as a distributed n-tier system of loosely coupled components (e.g., load balancers, servers, switches, disk arrays, etc.), it being understood that the present invention should not be limited thereto. Data center 70 replies to user requests received from client computer systems. Each loosely coupled component of data center 70 has a limited processing bandwidth which means that each component can process a limited number of requests from other components or from client computer systems in a given period of time. For purposes of explanation only, it will be presumed that each loosely coupled component in data center 70 prioritizes requests in accordance with the present invention, it being understood that the present invention should not be limited thereto.

Data center 70 includes a load balancer 72 coupled to client computer systems 74 and 76 via the Internet. The load balancer in turn is coupled to a tier of web servers $80a$-$80w$. User requests are received by the load balancer and subsequently distributed to web servers $80a$-$80w$. A tier of application servers $82a$-$82x$ are coupled to web servers $80a$-$80w$ via LAN 84. Application servers $82a$-$82x$ execute application programs to process requests received from client computer systems (e.g., client computer systems 74 and 76) via web servers $80a$-$80w$. Instances of the same application program may be executing on several of the servers $82a$-$82x$, while other application servers execute different application programs. It is noted that application servers $82a$-$82x$ may also be coupled directly to client computer systems (not shown in FIG. 4) via LAN 84 so that application servers $82a$-$82x$ can receive and process requests generated by these locally connected client computer systems.

Application servers $82a$-$82x$ are coupled to a tier of database servers $86a$-$86y$ via data access network 90. Database servers $86a$-$86y$ execute database management systems that present one or more databases for data access to the application programs executing on application servers $82a$-$82x$. Lastly, SAN 92 consisting of switches, routers, and/or hubs (not shown) couples database servers $86a$-$86y$ to a tier of storage systems $94a$-$94z$. For purposes of explanation, each of storage systems $94a$-$94z$ takes form in a disk array, it being understood that the term storage system should not be limited thereto.

Figure 3:
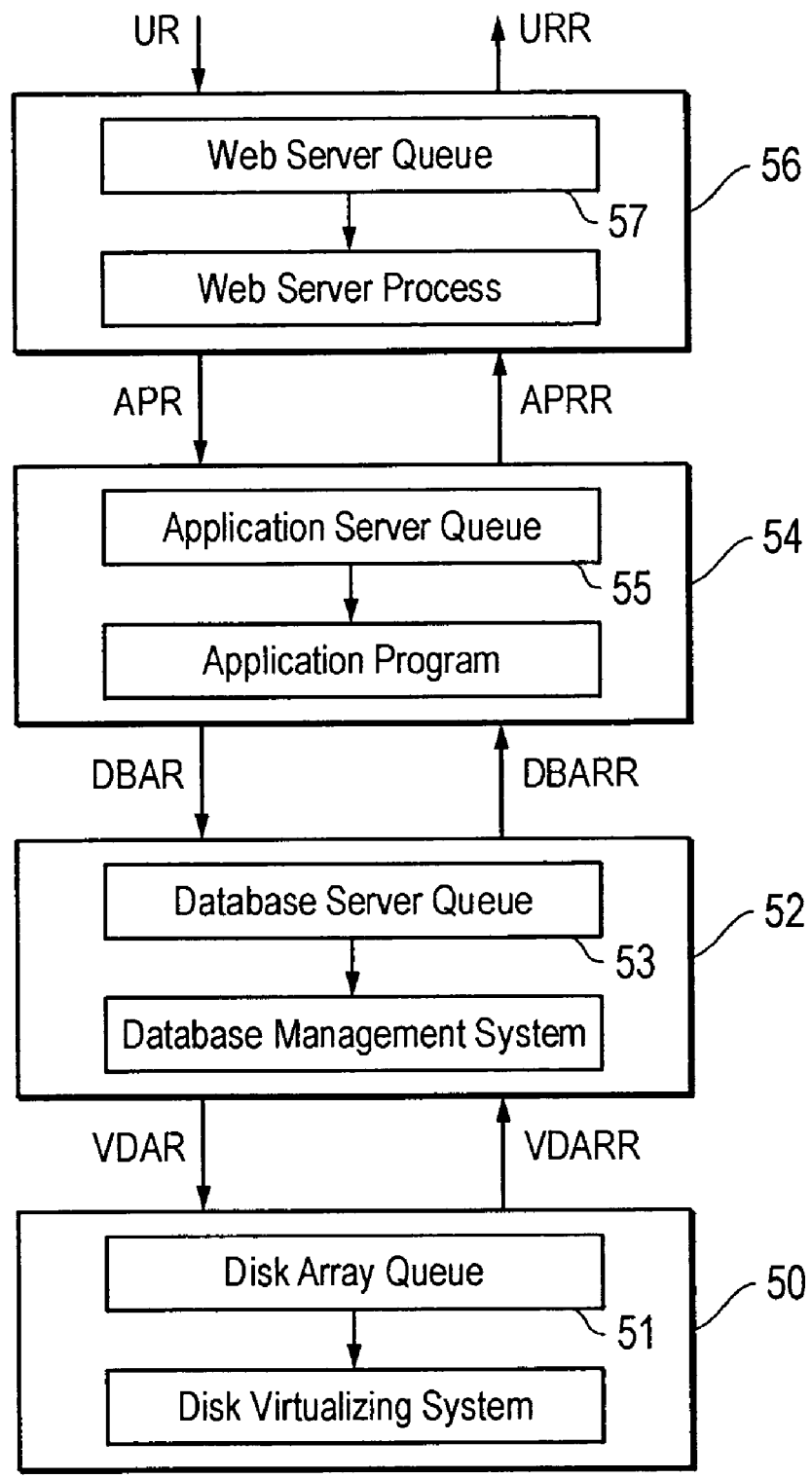
FIG. 3 illustrates relevant components of an execution path.

Data center 70 is substantially similar to data center 10 shown in FIG. 1. Components of data center 70, like data center 10, form execution paths for replying to user requests received from client computer systems. The execution paths of data center 70 operate substantially similar to the execution path described in FIG. 3. However, a major distinction exists between execution paths of data center 10 of FIG. 1 and execution paths of data center 70 of FIG. 4. More particularly, some or all components of data center 70 include a request prioritizer circuit. Again, for the purposes of explanation only, it will be presumed that all components of data center 70 include a request prioritizer circuit. Each request prioritizer circuit operates to calculate and assign a priority value to each request it receives from another component of data center 70 or to each user request received from a client computer system.

Figures 5, 6:
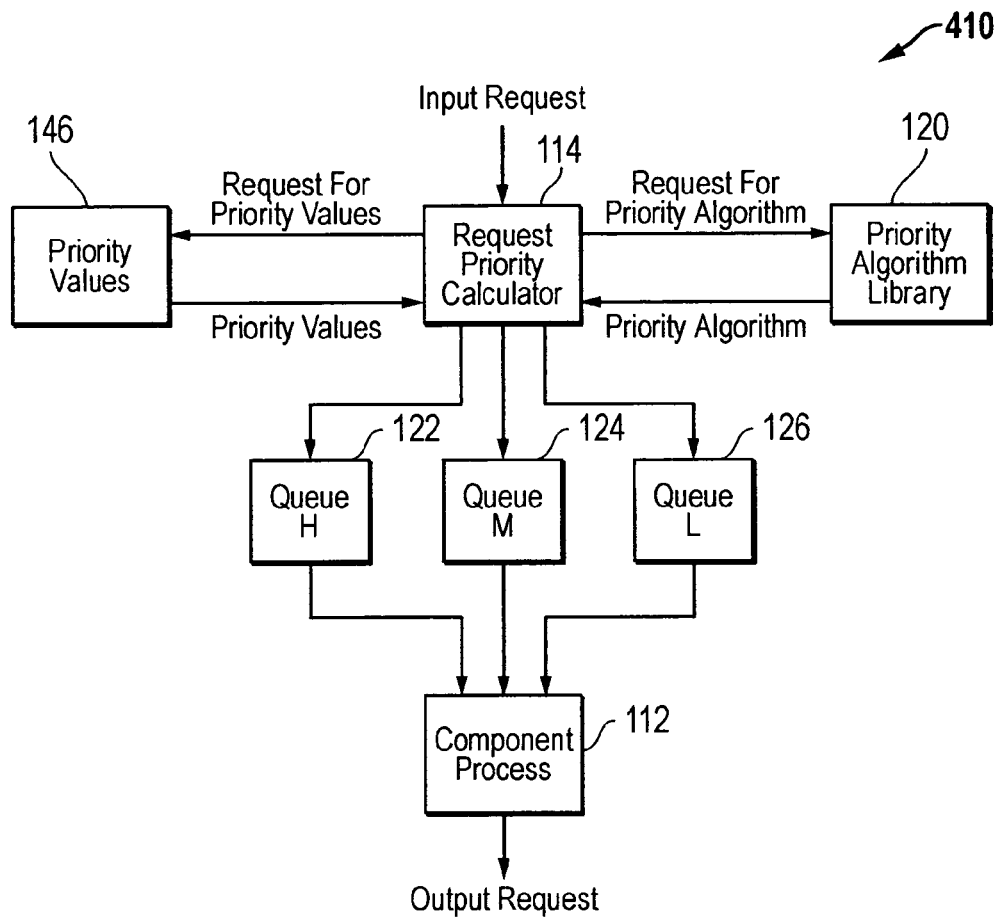
FIG. 5 Illustrates relevant components of a prioritizer circuit for generating request priority values according to one embodiment of the present invention.
FIG. 6 illustrates exemplary priority value tables used in the prioritizer circuit of FIG. 5.

FIG. 5 illustrates one embodiment of a request prioritizer circuit 110 employed in each of the components (e.g., load balancer 72, web servers $80a$-$80w$, application servers $82a$-$82x$, etc.) of data center 70. The request prioritizer circuit 110 shown in FIG. 5 is in data communication with a component process (e.g., the application program executing on one or more processors of application server $80a$, the database management system executing on one or more processors of database server $82b$, the storage software executing on one or more processors of disk array $94b$, etc.) 112. Request prioritizer circuit 110 includes a priority calculator 114 coupled to a memory 116 for storing priority values and a memory 120 that acts as a library for storing priority algorithms, both of which will be more fully described below. Request prioritizer circuit 110 also includes two or more queues for storing requests inputted from other components in the data center 70 or from client computer systems. Usually the number of queues a component may have for storing requests depends on the resources (or memory) to which the component has access. Different components may well have different number of queues. In the embodiment shown in FIG. 5, request priority calculator 114 is coupled to three queues designated high priority queue 122, moderate priority queue 124, and low priority queue 126. Priority calculator 114 may take form in software instructions executing on one or more processors. In another embodiment, priority calculator 114 may take form in hardware such as a microcontroller or an application specific integrated circuit. Priority calculator calculates a priority value P for each input request it receives as will be more fully described below.

In this embodiment, priority calculator 114 compares the priority P it calculates for each input request against two predetermined values designated $P_H$ and $P_L$. Thereafter, the input request is sorted into one of the queues 122-126 according to the comparison. To illustrate, the input request is routed to and stored into high priority queue 122 if priority P for the input request is calculated to have a numerical value greater than predetermined value $P_H$. The input request is routed to and stored in low priority queue 126 if the calculated priority P has a numerical value less than predetermined value $P_L$. Or the input request is routed to and stored in moderate priority queue 124 if its priority P is calculated to have a numerical value greater than $P_L$, but lower than $P_H$. In one embodiment, the priority value P is stored along with its corresponding input request.

Priority calculator 114 receives input requests from a component (e.g., load balancer 72, database server 86a, etc.) of data center 70 or a client computer system (e.g., client computer systems 74 and 76). Each request includes one or more attribute values. Attributes of a request may include: an identity of an application executing on an application server in data center 70, a profile of a user associated with the input request, a time stamp such as the time when the input request was generated, application run-time data (e.g., the number or total cost of shares in a company to buy or sell), etc. To illustrate, priority calculator may sequentially receive exemplary first and second input requests that have attributes identifying user profiles and applications executing on application servers 82a-82x, respectively. For purposes of explanation, it will be presumed that the first and second requests are database access requests received from application servers 82a and 82b, respectively. The user profile attribute of the first input request is set to or has a value UP3 while the application attribute of the first input request is set to or has a value APP2, which identifies the application program executing on application server 82a. For purposes of explanation it will be presumed that the application program executing on application server 82a generated the first input request. The user profile attribute of the second input request is set to or has a value UP2 while the application attribute of the second input request is set to or has a value APP1, which identifies the application program executing on application server 82b. For purposes of explanation it will be presumed that the application program executing on application server 82b generated the second input request. It is noted that the first and second input requests may include additional attributes.

Priority calculator 114 calculates a request priority P for each input request using a priority algorithm read from library 120 and using priority values read from memory 116. The priority algorithm read from library 114 defines the priority values needed from memory 116 to calculate priority P. It is noted that attribute values (e.g., a time stamp) in the input request itself may also be used to calculated request priority P. Priority algorithm library 120 may include several algorithms. For purposes of explanation, it will be presumed that library 120 in each component of data center 70 contains one request priority algorithm. The priority algorithm stored in libraries of components in data center 70 may vary. For example, the priority algorithm of library 120 in web servers 80a-80w may be different than the priority algorithm of library 120 in application servers 82a-82x. Further, the priority algorithm of library 120 in web server 80a may be different from the priority algorithm of library 120 in web server 80b.

For each input request received, priority calculator 114 reads priority values stored in one or more tables in memory 116 using one or more attribute values of the input request as table indexes. An exemplary priority algorithm may take form in:

$$P = Wa*V(APPx) + Wu*V(UPy)$$

where Wa and Wu are weighting values, V(APPx) is the priority value corresponding to application attribute value APPx of the input reqeust, and V(UPy) is the priority value corresponding to the user profile attribute value UPy of the input request. Other priority algorithms are contemplated.

FIG. 6 illustrates two exemplary priority value tables 140 and 142 stored in memory 116. Each of the tables 140 and 142 includes multiple entries. Each entry consists of an attribute value and its corresponding priority value. Table 140 consists of m entries each having a user profile attribute value and corresponding user profile priority value, while table 142 consists of n entries each having an application attribute value and a corresponding application priority value.

In the example above in which priority calculator 114 receives first and second input requests, priority calculator 114 accesses table 140 using user profile attribute value UP3 of the first input request and reads 20, the user profile priority value corresponding to UP3. Priority calculator 114 accesses table 142 using user application attribute value APP2 of the first input request and reads 30, the application priority value corresponding to APP2. Priority calculator 114 calculates a priority P1 for the exemplary first input request as a function of the priority values 20 and 30 read from tables 140 and 142, respectively. More particularly, priority calculator employs the priority algorithm in library 12 to calculate priority P1 using priority values 20 and 30 read from tables 140 and 142. Priority calculator 114 then compares priority P1 to predetermined values $P_H$ and $P_L$. After comparison, the first input request is stored in one of the queues 122-126. For purposes of explanation, it will be presumed that the first input request is stored in queue 126 based on the comparison of P1 to $P_H$ and $P_L$.

After the exemplary first input request is prioritized, priority calculator 114 accesses table 140 using user profile attribute value UP2 of the exemplary second input request and reads 50, the user profile priority value corresponding to UP2. Priority calculator 114 also accesses table 142 using user application attribute value APP1 of the exemplary second input request and reads 70, the application priority value corresponding to APP1. Priority calculator 114 then calculates a priority P2 for the second input request as a function of the priority values 50 and 70 read from tables 140 and 142. More particularly, priority calculator employs the same priority algorithm in library 12 to calculate priority P2 that was used to calculate priority P1. Priority calculator 114 uses priority values 50 and 70 read from tables 140 and 142 to calculate P2. Priority calculator 114 then compares priority P2 to predetermined values $P_H$ and $P_L$. After comparison, the second input request is stored in one of the queues 122-126. For purposes of explanation, it will be presumed that the second input request is stored in queue 122 based on the comparison of P2 to $P_H$ and $P_L$.

Component process 112 processes requests stored within queues 122-126. Component process 112 processes all requests pending in queue 122 in the order they are received therein before component process 112 processes any request pending within queues 124 and 126. When queue 122 is empty, component process 112 processes all requests pending in queue 124 in the order they are received therein before component process 112 processes any request pending within queue 126. However, if queue 122 receives a new request from priority calculator 114 while component process 112 is processing requests pending in queues 124 or 126, component process 112 will process the new request in queue 122 before component process 112 processes any more requests pending in queues 124 or 126. Likewise, if queue 124 receives a new request from priority calculator 114 while component process 112 is processing requests pending in queue 126, component process 112 will process the new request in queue 124 before component process 112 processes any more requests pending in queue 126. In the example set forth above, process 112 processes the second input request stored in queue 122 before the first input request stored in queue 126 even though priority calculator 114 received the first input request before the second input request.

Component process 112 generates one or more output requests in response to receiving and processing a request stored in any one of the queues 122-126. For purposes of explanation, it will be presumed that component process 112 generates one output request (e.g., an application processing request, a database access request, a virtual disk access request, etc.) in response to processing an input request received from any one of the queues 122-126. Thus, process 112 generates first and second output requests to, for example, access a virtual disk provided by one of the disk arrays 94a-94z in response to processing the first and second input requests mentioned above. In one embodiment, each output request generated by process 112 will include the same attributes of its respective input request. In another embodiment, process 112 may include an attribute in the output request that was not included in its respective input request. In yet another embodiment, the output request may lack an attribute that was contained in its respective input request. In still another embodiment, one or more attribute values of the output request may be different than corresponding attribute values in the respective input request, even though the attributes of the input request and output request are the same.

The output requests generated by component process 112, in one embodiment, are transmitted to the request prioritizer circuit (not shown) of a subsequent component (e.g., application server 80w, database server 86a, disk array 94a, etc.) of data center 70. The request prioritizer circuit of the subsequent component operates in substantially the same manner as the request prioritizer circuit 110 of FIG. 5. Namely, the request prioritizer circuit of the subsequent component calculates a request priority P for each input request using a priority algorithm read from its algorithm library, priority attribute values read from its memory, and/or attributes values or information contained in the input request. Thereafter, the input request is sorted into one of several queues according to the value of the calculated priority P. For example the request prioritizer circuit of the subsequent component may generate priority values P3 and P4 for the first and second output requests, respectively, received from the previous component mentioned above. In one embodiment, the priority value P3 should have a greater numerical value than P4 such that first and second output requests from the previous component are sorted into queues 126 and 124, respectively of the subsequent component. As such, requests received by the data center 70 will collectively receive consistent and distinguishable priority values across multiple components of data center 70. For instance, presume data center 70 is a stock system the components of which define priority values based on user profile and transaction dollar amount. Suppose user A and user B transmit stock purchase requests to data center 70. However, user A seeks to purchase a large dollar amount (e.g., $1,000,000) of stock with his request, while user B seeks to purchase a much smaller dollar amount (e.g., $5,000) of stock with his request. Further presume that users A and B have the same profile. In this example all components in data center 70 should generate priority values for requests associated with the $1,000,0000 request, which are greater numerically than the generated priority values associated with the $5,000 request. As such data center 70 should respond more quickly to user A's request than user B's request.

Each component of data center 70, in one embodiment, includes the request prioritizer circuit of FIG. 5. In one embodiment, the priority calculator of each request prioritizer circuit has access to its own or local priority values memory. In this embodiment the priority values stored in two or more priority values memories may be different from each other. In another embodiment, each request prioritizer circuit has access to the same priority values. In other words, data center 70 contains a single priority values memory that is accessible by all request priority calculators. In this embodiment, priority values are consistently used to calculate request priority P in all components of data center 70 that employ a request prioritizer circuit. This way can provide a consistent way to compute the priority value for all the involved attributes. In still another embodiment, some priority values can be stored in a single priority values memory that is accessible by all request priority calculators, while other priority values are stored in local priority values memories that are accessible by respective priority calculators.

In one embodiment, each of the components of data center 70 may use a common algorithm to calculate request priority P. In this embodiment, each request prioritizer circuit could access the common request priority algorithm from a single algorithm library 120 in data center 70. In another embodiment, the priority calculators access respective priority algorithm libraries. In this embodiment, two or more priority algorithm libraries store distinct priority algorithms.

In another embodiment, the priority P calculated at one component (e.g., load balancer 72) of data center 70 for an input user request, may be passed along with a respective output request to subsequent component (e.g., one of the web servers 80a-80w) of center 70, rather than having the subsequent component calculate a new priority value.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method implemented by one or more computer systems comprising:
   a first component receiving first and second requests;
   generating first and second priority values corresponding to the first and second requests, respectively;
   the first component processing the first and second requests to generate third and fourth requests, respectively, wherein the first request is processed before the second request if the first priority value is numerically greater than the second priority value, or the first request is processed after the second request if the first priority value is numerically less than the second priority value;

a second component receiving the third and fourth requests;

generating third and fourth priority values corresponding to the third and fourth requests, respectively;

the second component processing the third and fourth requests wherein the third request is processed before the fourth request if the third priority value is numerically greater than the fourth priority value, or the third request is processed after the fourth request if the third priority value is numerically less than the fourth priority value, and if the first priority value is numerically greater than the second priority value, then the third priority value generated by the second component will be numerically greater than or equal to the fourth priority value.

2. The method of claim 1 wherein the first component comprises a first set of software instructions executing on one or more processors, and wherein the second component comprises a second set of software instructions executing on the one or more processors, wherein the first set of software instructions is different from the second set of software instructions.

3. The method of claim 1 wherein the first priority value is numerically greater than the second priority value, and wherein the third priority value is greater than the fourth priority value.

4. The method of claim 1 wherein the first and second priorities are generated according to a first algorithm, wherein the third and fourth priorities are generated according to a second algorithm, and wherein the first and second algorithms are different from each other.

5. The method of claim 1:
wherein the first and second priority values are generated as a function of first and second quality of service (QoS) attribute values, respectively, corresponding to the first and second requests, respectively;
wherein the third and fourth priority values are generated as a function of third and fourth QoS attribute values, respectively, corresponding to the third and fourth requests, respectively;
wherein the first and third attribute values are the same;
wherein the second and fourth attribute values are the same;
wherein the first and second attribute values are different from each other.

6. The method of claim 1:
wherein the first and second priority values are generated as a function of first and second quality of service (QoS) attribute values, respectively, corresponding to the first and second requests, respectively;
wherein the third and fourth priority values are generated as a function of third and fourth QoS attribute values, respectively, corresponding to the third and fourth requests, respectively;
wherein the first and third attribute values are different from each other;
wherein the second and fourth attribute values are different from each other;
wherein the first and second attribute values are different from each other.

7. The method of claim 1:
the first component reading from a memory device first data corresponding to first information contained in the first request and second data corresponding to second information contained in the second request, wherein the first data is different from the second data;
wherein the first priority value is generated as a function of the first data, and wherein the second priority value is generated as a function of the second data.

8. One or more computer readable storage mediums for storing instructions, wherein a method is implemented in response to executing the instructions, the method comprising:

generating first and second priority values corresponding to first and second requests, respectively, received by a first component;

the first component processing the first and second requests to generate third and fourth requests, respectively, wherein the first request is processed before the second request if the first priority value is numerically greater than the second priority value, or the first request is processed after the second request if the first priority value is numerically less than the second priority value;

generating third and fourth priority values corresponding to the third and fourth requests, respectively, received by a second component;

the second component processing the third and fourth requests wherein the third request is processed before the fourth request if the third priority value is numerically greater than the fourth priority value, or the third request is processed after the fourth request if the third priority value is numerically less than the fourth priority value, and if the first priority value is numerically greater than the second priority value, then the third priority value generated by the second component will be numerically greater than or equal to the fourth priority value.

9. The one or more computer readable storage mediums of claim 8 wherein the first component comprises a first set of software instructions executing on one or more processors, and wherein the second component comprises a second set of software instructions executing on the one or more processors, wherein the first set of software instructions is different from the second set of software instructions.

10. The one or more computer readable storage mediums of claim 8 wherein the first priority value is numerically greater than the second priority value, and wherein the third priority value is numerically greater than the fourth priority value.

11. The one or more computer readable storage mediums of claim 8 wherein the first and second priorities are generated according to a first algorithm, wherein the third and fourth priorities are generated according to a second algorithm, and wherein the first and second algorithms are different from each other.

12. The one or more computer readable storage mediums of claim 8:
wherein the first and second priority values are generated as a function of first and second quality of service (QoS) attribute values, respectively, corresponding to the first and second requests, respectively;
wherein the third and fourth priority values are generated as a function of third and fourth QoS attribute values, respectively, corresponding to the third and fourth requests, respectively;
wherein the first and third attribute values are the same;
wherein the second and fourth attribute values are the same;
wherein the first and second attribute values are different from each other.

13. The one or more computer readable storage mediums of claim 8:

wherein the first and second priority values are generated as a function of first and second quality of service (QoS) attribute values, respectively, corresponding to the first and second requests, respectively;

wherein the third and fourth priority values are generated as a function of third and fourth QoS attribute values, respectively, corresponding to the third and fourth requests, respectively;

wherein the first and third attribute values are different from each other;

wherein the second and fourth attribute values are different from each other;

wherein the first and second attribute values are different from each other.

14. The one or more computer readable storage mediums of claim 8 wherein the method further comprises:

the first component reading from a memory device first data corresponding to first information contained in the first request and second data corresponding to second information contained in the second request, wherein the first data is different from the second data;

wherein the first priority value is generated as a function of the first data, and wherein the second priority value is generated as a function of the second data.

15. A data center comprising:

a memory;

a processor coupled to the memory;

a first component for receiving first and second requests;

a first means for generating first and second priority values corresponding to the first and second requests, respectively;

wherein the first component is configured to process the first and second requests to generate third and fourth requests, respectively, wherein the first request is processed before the second request if the first priority value is numerically greater than the second priority value, or the first request is processed after the second request if the first priority value is numerically less than the second priority value;

a second component for receiving the third and fourth requests;

a second means for generating third and fourth priority values corresponding to the third and fourth requests, respectively;

wherein the second component is configured to process the third and fourth requests wherein the third request is processed before the fourth request if the third priority value is numerically greater than the fourth priority value, or the third request is processed after the fourth request if the third priority value is numerically less than the fourth priority value;

wherein if the first priority value is numerically greater than the second Priority value, then the third Priority value generated by the second component will be numerically greater than or equal to the fourth priority value.

\* \* \* \* \*